US008962177B2

United States Patent
Kim et al.

(10) Patent No.: US 8,962,177 B2
(45) Date of Patent: Feb. 24, 2015

(54) SECONDARY BATTERY

(75) Inventors: Dukjung Kim, Yongin-si (KR); In Kim, Yongin-si (KR); Joongheon Kim, Yongin-si (KR)

(73) Assignees: Samsung SDI Co., Ltd., Yongin-Si, Gyeonggi-Do (KR); Robert Bosch GmbH, Stuttgart (DE)

( * ) Notice: Subject to any disclaimer, the term of this patent is extended or adjusted under 35 U.S.C. 154(b) by 166 days.

(21) Appl. No.: 13/445,053

(22) Filed: Apr. 12, 2012

(65) Prior Publication Data
US 2013/0149598 A1 Jun. 13, 2013

Related U.S. Application Data

(60) Provisional application No. 61/568,865, filed on Dec. 9, 2011.

(51) Int. Cl.
*H01M 2/26* (2006.01)
*H01M 2/28* (2006.01)

(52) U.S. Cl.
USPC .......................................... 429/161; 429/209

(58) Field of Classification Search
None
See application file for complete search history.

(56) References Cited

U.S. PATENT DOCUMENTS

2003/0027041 A1* 2/2003 Hamada et al. .............. 429/161
2003/0031923 A1* 2/2003 Aoshima et al. ............. 429/127
2004/0191612 A1* 9/2004 Akita et al. .................... 429/94
2005/0132562 A1* 6/2005 Saito et al. .................. 29/623.5
2005/0260488 A1 11/2005 Zhou et al.
2007/0196732 A1* 8/2007 Tatebayashi et al. ......... 429/181
2009/0208828 A1 8/2009 Kanai et al.
2010/0196749 A1 8/2010 Yoshida et al.
2011/0129720 A1 6/2011 Yun

FOREIGN PATENT DOCUMENTS

| EP | 2375475 A1 | 10/2011 | |
| JP | 2005-142026 * | 6/2005 | ............ H01M 10/04 |
| JP | 2005-259379 A | 9/2005 | |
| JP | 2006-147531 A | 6/2006 | |
| JP | 2008-130261 | 6/2008 | |
| JP | 2011-108391 A | 6/2011 | |
| KR | 10-2011-0061315 A | 6/2011 | |

OTHER PUBLICATIONS

European Search Report dated Nov. 21, 2012.

* cited by examiner

*Primary Examiner* — Cynthia K. Walls
(74) *Attorney, Agent, or Firm* — Lee & Morse, P.C.

(57) ABSTRACT

Embodiments provide a secondary battery, which can suppress deformation of an electrode assembly and a current collector by installing a damping member between a non-coating portion of the electrode assembly and a can. In one embodiment, the secondary battery includes a can having an accommodating space and an open top portion; a plurality of electrode assemblies inserted into the can; a current collector connected to the non-coating portion of the electrode assembly; a damping member made of an elastic material between the electrode assembly and the can; and a cap plate sealing the can.

16 Claims, 5 Drawing Sheets

SECONDARY BATTERY

CROSS-REFERENCE TO RELATED APPLICATION

The present application claims priority under 35 U.S.C. §119(e) to U.S. Provisional Application No. 61/568,865, filed on Dec. 9, 2011, and entitled: "SECONDARY BATTERY," which is incorporated herein by reference in its entirety.

BACKGROUND

1. Field

Embodiments relate to a secondary battery.

2. Description of the Related Art

A rechargeable secondary battery can be repeatedly charged and discharged, unlike primary batteries, which are incapable of being recharged. A low capacity rechargeable battery composed of a single cell is generally used for a portable small electronic device, such as a mobile phone or a camcorder. A large capacity rechargeable battery composed of a plurality of cells connected in a form of a pack is widely used as power supply to drive motors of hybrid electric vehicles.

Secondary batteries may be classified into different types, for example, prismatic and cylindrical batteries. An electrode assembly is formed by disposing a separator as an insulator between positive and negative electrode plates. An electrolyte is injected into a can and a cap assembly having electrode terminals is installed in the can.

SUMMARY

In accordance with an embodiment, there is provided a battery including an electrode assembly having an electrode uncoated region, a current collector including a current collector coupling part coupled to the electrode uncoated region, a case accommodating the electrode assembly, and an elastic damping member, the elastic damping member engaging the current collector coupling part.

The elastic damping member may be in an elastically deformable relationship with respect to the current collector coupling part.

The current collector coupling part may include a plurality of current collector coupling parts. The electrode uncoated region includes a plurality of electrode uncoated regions. The plurality of current collector coupling parts may be coupled to the plurality of electrode uncoated regions.

The elastic damping member may be disposed between a pair of current collector coupling parts.

In an assembled condition of the electrode assembly and the case, the elastic damping member may be in a compressed state to exert a pressing force that presses the pair of current collector coupling parts.

The elastic damping member may include a first region coupled to at least one of the electrode uncoated regions, a second region pressing against the pair of the current collector coupling parts, and a third region contacting an inner side of the case.

The first region of the elastic damping member may have a convexly curved surface.

The second region may have a width that is smaller than a width of the first region. The second region may define a space that accommodates respective ones of the current collector coupling parts.

The third region of the elastic damping member may have a convexly curved surface. The third region may be symmetrical to the first region.

The electrode uncoated regions may include a pair of electrode uncoated regions that are parallel to each other in a first direction. The current collector coupling parts may be coupled to facing surfaces of the pair of electrode uncoated regions. The elastic damping member may be located in a space between the current collector coupling parts such that the pressing force presses the current collector coupling parts against the electrode uncoated regions.

The elastic damping member may include a hole extending through the elastic damping member in the first direction.

The case may further include a cap plate coupled with the case. The current collector further may further include a terminal part that extends through the cap plate. The current collector may further include a body part that is connected to the terminal part and a bent part that is bent from the body part in a first direction. The current collector coupling parts may extend from the body part in the first direction.

The electrode uncoated regions may be parallel to each other in the first direction and may be arranged in a second direction perpendicular to the first direction. The bent part may have a width sufficient to cover the electrode uncoated regions in the second direction.

The elastic damping member may be made of an electrically insulating material. The elastic damping member may be made of a plastic material.

The elastic damping member may be made of an electrically conductive material. The elastic damping member may be made of a same material as the current collecting coupling part.

The electrode uncoated region may include first and second electrode uncoated regions at opposite sides of the electrode assembly. The current collector may include a first current collector including a first coupling part coupled to the first electrode uncoated region and a second current collector including a second coupling part coupled to the second electrode uncoated region. The elastic damping member may include a first elastic damping member engaging the first current collector coupling part and a second elastic damping member engaging the second current collector coupling part.

The electrode assembly may include a plurality of electrode assemblies inside the case, each electrode assembly having a respective electrode uncoated region. The current collector may include a plurality of current collector coupling parts, each of the current collector coupling parts being coupled to the respective electrode uncoated region of one of the electrode assemblies. The elastic damping member may include a plurality of elastic damping members, each being disposed to engage certain ones of the current collector coupling parts.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1:
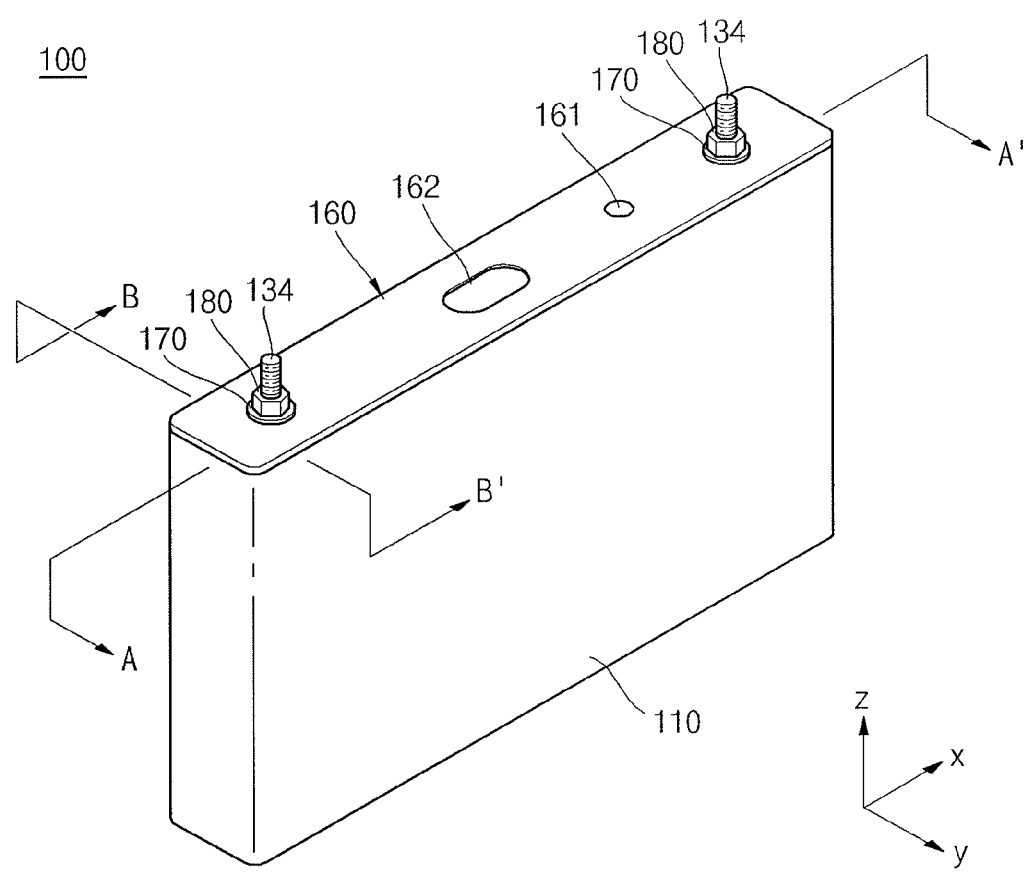
FIG. 1 illustrates a perspective view of a secondary battery according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. Like reference numerals refer to like elements throughout.

Hereinafter, a configuration of a secondary battery according to an embodiment will be described.

Figure 2:
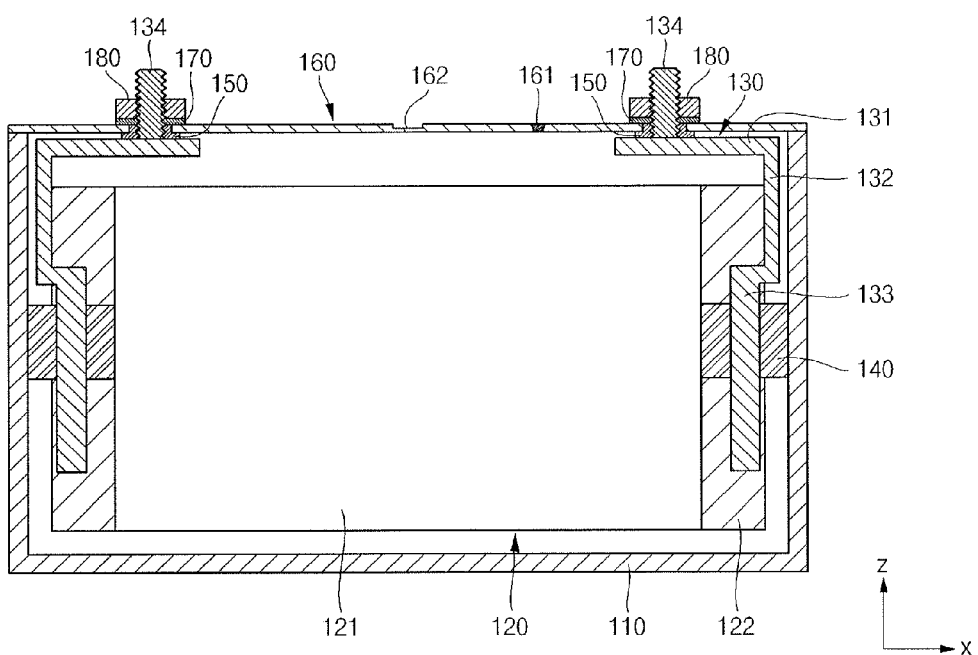
FIG. 2 illustrates a cross-sectional view taken along the line A-A' of FIG. 1.
Figure 3:
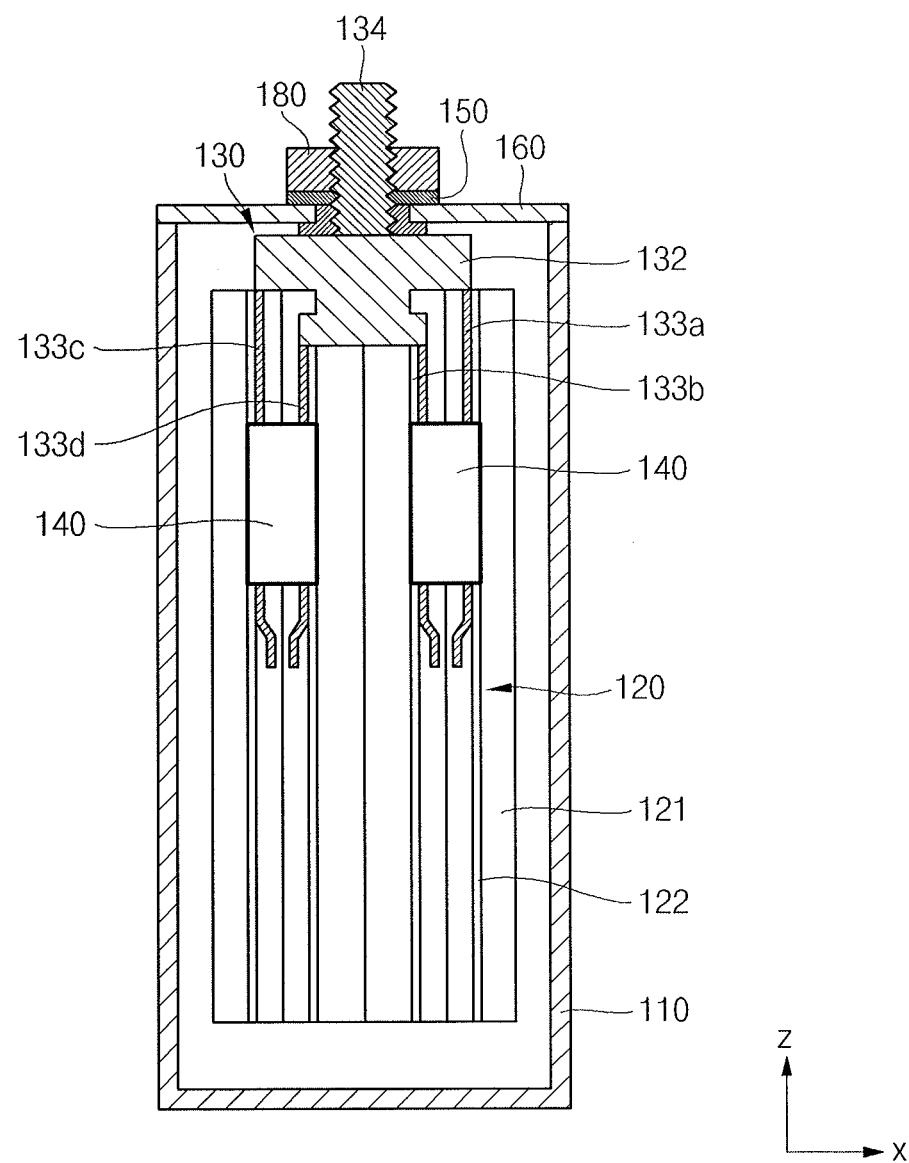
FIG. 3 illustrates a cross-sectional view taken along the line B-B' of FIG. 1.
Figure 4:
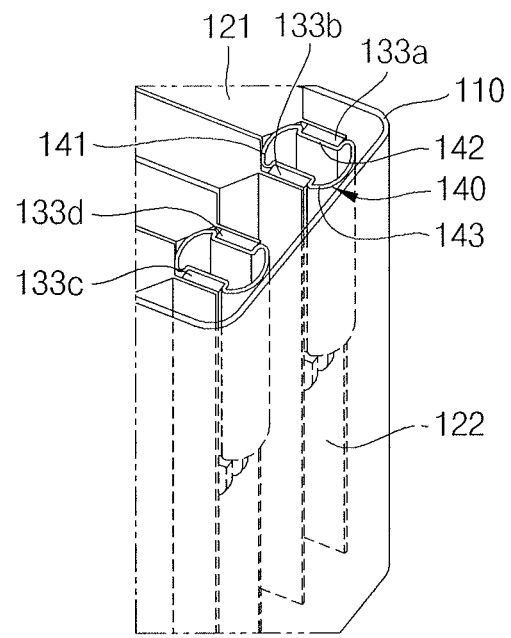
FIG. 4 illustrates a top view depicting a state in which a damping member is coupled between an electrode assembly and a case.
Figure 5:
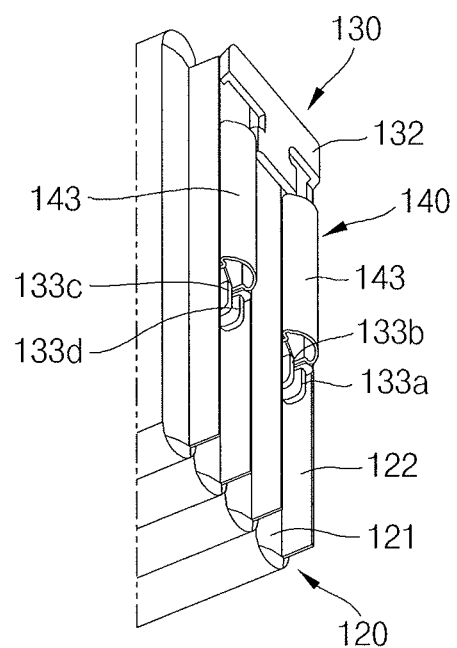
FIG. 5 illustrates a bottom view depicting a state in which a damping member coupled between an electrode assembly and a case.
Figure 6:
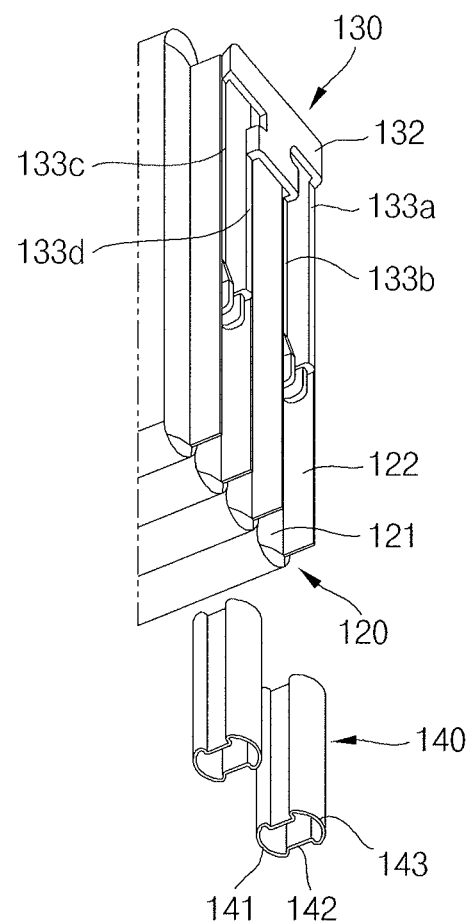
FIG. 6 illustrates a view depicting a state in which a damping member is separated from an electrode assembly.

FIG. 1 is a perspective view of a secondary battery according to an embodiment, FIG. 2 is a cross-sectional view taken along the line A-A' of FIG. 1, FIG. 3 is a cross-sectional view taken along the line B-B' of FIG. 1, FIG. 4 is a top view illustrating a state in which a damping member is coupled between an electrode assembly and a case, FIG. 5 is a bottom view illustrating a state in which a damping member is coupled between an electrode assembly and a case, and FIG. 6 is a view illustrating a state in which a damping member is separated from an electrode assembly.

Referring to FIGS. 1 to 6, the secondary battery 100 may include a case 110, an electrode assembly 120 inserted into the case 110, a current collector 130 connected to the electrode assembly 120, a damping member 140 coupled to the electrode assembly 120, a first insulating member 150 formed on the current collector 130, a cap plate 160 sealing the case 110, a second insulating member 170 formed on the cap plate 160, and a nut 180 formed on the second insulating member 170.

The case 110 may have an internal accommodating space and may have a substantially hexahedral shape with a top opening. As an example, the case 110 may be in the form of a battery can. The electrode assembly 120 and electrolyte may be accommodated in the internal accommodating space of the case 110. The case 110 may be formed of a conductive material such as aluminum, an aluminum alloy or nickel plated steel. Since FIG. 1 illustrates a state in which the case 110 and the cap plate 160 are coupled to each other, an opening is not shown in FIG. 1. However, the opening corresponds to a substantially opened portion of the peripheral portion of the cap plate 160. In addition, the inner surface of the case 110 may be insulated, so that the case 110 may be insulated from the electrode assembly 120, the current collector 130 and the cap plate 160.

In addition, the damping member 140 may be formed between the case 110 and the electrode assembly 120. In addition, the damping member 140 may be coupled to the current collector 130 while pressing the current collector 130 coupled to the electrode assembly 120. Therefore, the damping member 140 may immobilize the electrode assembly 120 and the current collector 130 in the case 110 so as to prevent the electrode assembly 120 and the current collector 130 from moving within the case 110.

The electrode assembly 120 may be fabricated by winding or by stacking a stacked structure having the first electrode plate, the second electrode plate and the separator positioned therebetween, which may be formed of thin plates or layers.

The first electrode plate may function as, for example, a negative electrode and the second electrode plate may function as, for example, a positive electrode, or vice versa. The first electrode plate may be formed by coating an active material such as graphite or carbon on an electrode current collector made of a metal foil such as copper or nickel. The first electrode plate may have a non-coating portion that is not coated with the active material. The second electrode plate may be formed by coating an active material such as a transition metal oxide on an electrode current collector made of a metal foil such as aluminum. The second electrode plate may have a non-coating portion that is not coated with the active material. The separator, which is positioned between the first electrode plate and the second electrode plate, may prevent a short circuit and may allow lithium ions to move between the first electrode plate and the second electrode plate. The separator may be made of polyethylene (PE), polypropylene (PP), or a composite film of PE and PP. In other implementations, other materials may be used for the electrode plates and the separator.

The electrode assembly 120 may include a plurality of electrode assemblies that may be substantially accommodated in the case 110 together with electrolyte. While four electrode assemblies 120 are shown in the illustrated embodiment, the number of electrode assemblies 120 may vary from what is shown. The electrolyte may include an organic solvent such as EC (ethylene carbonate), PC (propylene carbonate), DEC (diethyl carbonate), EMC (ethyl methyl carbonate) or DMC (dimethyl carbonate) and a lithium salt such as $LiPF_6$ or $LiBF_4$. The electrolyte may be in a liquid, solid or gel phase.

The electrode assembly 120 may be formed by winding the electrode plates, each including a coating portion 121 coated with an active material and a non-coating portion 122 without the active material coated thereon. The non-coating portions 122 may be positioned at opposite edges of the coating portion 121. The non-coating portions 122 may correspond to a first electrode and a second electrode, respectively. If the electrode assembly 120 includes a plurality of electrode assemblies, the electrode assemblies 120 may be arranged such that the non-coating portions 122 of the same electrode are positioned in the same direction. In addition, the electrodes of the secondary battery may include a pair of current collectors 130 connected to the non-coating portions 122.

The non-coating portions 122 may be coupled to the current collectors 130 by welding. In a state in which a plurality of the electrode assemblies 120 and/or a plurality of non-coating portions 122 are provided, the current collectors 130 may be positioned parallel with the non-coating portions 122 in a vertical direction (in the z-axis direction of the drawing) to then be welded with the non-coating portions 122. Therefore, the non-coating portions 122 formed in the plurality of electrode assemblies 120 may be electrically connected to each other by the current collectors 130.

In addition, after the current collectors 130 are coupled to the non-coating portions 122, the non-coating portions 122 may be coupled to the damping member 140. The damping member 140 may be coupled between the non-coating portions 122. One end of the damping member 122 may come into contact with the non-coating portion 122, and the other end of the damping member 122 may come into contact with the case 110. Therefore, positions of the non-coating portions 122 may be fixed within the case 110 by the damping member 140. In addition, the damping member 140 may compressively press the current collectors 130 on the non-coating portions 122. Accordingly, positions of the current collectors 130 may also be fixed by the damping member 140.

A pair of current collectors 130 may be provided to then be connected to the non-coating portions 122 each having a polarity. The current collectors 130 may be connected to the electrode assemblies 120 through the non-coating portions 122 and then may be exposed to the outside of the cap plate 160, forming input/output paths of electrical signals.

The current collector 130 may include a body part 131 formed in parallel with the electrode assembly 110 in a horizontal direction (in the x-axis direction of FIG. 1), a bent part 132 bent from the body part 131 and formed substantially perpendicular to the electrode assembly 110 in a vertical direction (in the z-axis direction of FIG. 1), a current collector coupling part 133 extending from the bent part 132 and coupled to the non-coating portion 122, and a terminal part 134 protruding from the body part 131 in the vertical direction (in the z-axis direction of FIG. 1) and exposed to the outside of the cap plate 160.

The body part 131 may be shaped of a substantially planar plate and may be formed horizontally on the electrode assembly 110 along the length of the electrode assembly 110. The body part 131 may have a width enough to cover the arranged non-coating portions 122.

The bent part 132 may be bent from the body part 131 in the vertical direction and may extend parallel to the non-coating portion 122. The bent part 132 may have a width enough to cover the non-coating portions 122.

The current collector coupling part 133 may include a plurality of current collector coupling parts 133a, 133b, 133c and 133d and extends from the bent part 132 in the vertical direction. As many current collector coupling parts 133 as the non-coating portions 122 may be provided and each of the current collector coupling parts 133 may extend in parallel while contacting the non-coating portions 122. The current collector coupling part 133 may extend parallel with the non-coating portions 122 while a side surface of the current collector coupling part 133 may come into contact with a side surface of the non-coating portion 122. The current collector coupling part 133 may include two pairs of current collector coupling parts 133a and 133b, and 133c and 133d. One pair of the current collector coupling parts (for example, 133a and 133b) may be positioned inside a pair of non-coating portions 122. The pair of current collector coupling parts 133a and 133b may be positioned to come into contact with opposing inner surfaces of the pair of non-coating portions 122. In such a state, the pair of current collector coupling parts 133a and 133b may be coupled to the non-coating portions 122 by welding. In addition, after the pair of current collector coupling parts 133a and 133b is coupled to the pair of non-coating portions 122, the coupled current collector coupling parts 133a, 133b and the non-coating portions 122 may be compressed by the damping member 140. The damping member 140 may press the pair of current collector coupling parts 133a and 133b toward the non-coating portions 122, thereby allowing the pair of current collector coupling parts 133a and 133b to be maintained at states of being stably coupled to the non-coating portions 122.

The terminal part 134 may protrude from the body part 131 in the vertical direction (in the z-axis direction of FIG. 1). The terminal part 134 may further protrude upwardly with respect to the cap plate 160, forming an electrode terminal. In addition, a screw thread may be provided on the outer circumferential surface of the terminal part 134 and may be coupled to a nut 180 engaged from the top. The terminal part 134 may be integrally formed with the body part 131. In another implementation, the terminal part 134 may be coupled to the body part 131 by a separate structure.

The damping member 140 may be hollow and elongated in the vertical direction (in the z-axis direction of FIG. 1) corresponding to a lengthwise direction of the non-coating portion 122. The damping member 140 may be configured to have curved surfaces that are convexly formed toward the non-coating portions 122 and inner walls of the case 110 about a central region of the damping member 140. The damping member 140 may be coupled between the plurality of non-coating portions 122. The damping member 140 may be made of an elastic plastic material. After the current collector coupling part 133 of the current collector 130 is coupled to the non-coating portion 122, the damping member 140 may be coupled to the current collector 130 within the current collector coupling part 133 of the current collector 130. The damping member 140 may be coupled to the current collector 130 while pressing the pairs of current collector coupling parts 133a and 133b, and 133c and 133d within the pairs of current collector coupling parts 133a and 133b, and 133c and 133d. The damping member 140 may be made of an elastic material. One end of the damping member 140 may come into contact with the non-coating portion 122 and the other end of the damping member 140 may come into contact with the inner walls of the case 110. The damping member 140 may fix the non-coating portion 122 within the case 110 and may prevent the electrode assembly 120 and the current collector 130 from moving within the case 110. In addition, the damping member 140 may prevent the electrode assembly 120 and the current collector 130 from being subjected to external shocks and from being deformed.

The damping member 140 may have a hole formed therein, thereby providing a passageway for exhaust gases generated in the case 110. Accordingly, movement of the exhaust gases may not be restrained even with the damping member 140 being present. In addition, the damping member 140 may have increased elasticity due to presence of the hole. Accordingly, the damping member 140 may efficiently absorb a shock transmitted to the electrode assembly 120 and the current collector 130.

In more detail, the damping member 140 may include a first region 141 coupled to the non-coating portion 122, a second region 142 pressing the current collector 130 and a third region 143 contacting the inner walls of the case 110.

The first region 141 may have curved surfaces that are convexly formed toward the non-coating portion 122 and may be disposed between a pair of non-coating portions 122 while contacting the pair of non-coating portions 122. The non-coating portions 122 may come into contact with the curved surfaces. Accordingly, the non-coating portions are less likely to be damaged by the damping member 140. In addition, the first region 141 may be elongated along the vertical length direction of the non-coating portion 122 (in the z-axis direction of FIG. 1) while making surface contact with the non-coating portion 122. The first region 141 may efficiently prevent movement of the non-coating portion 122, caused by movement of the electrode assembly 120, using elasticity. In addition, the first region 141 may absorb a shock to prevent an external shock from being transmitted to the non-coating portion 122.

The second region 142 may be integrally connected to the first region 141 and may have a width smaller than the first region 141. The second region 142 may come into contact with the current collector coupling part 133 of the current collector 130. The second region 142 may press the current collector coupling part 133 using elasticity, thereby allowing the current collector coupling part 133 to be stably coupled to the non-coating portion 122 without being separated from the non-coating portion 122. In addition, the second region 142 may prevent the current collector coupling part 133 of the current collector 130 from moving within the case 110, and may prevent the external shock from being transmitted to the current collector coupling part 133.

The third region 143 may be integrally connected to the second region 142 and may be symmetrical to the first region 141 with respect to the second region 142. The third region 143 may have a curved surface that may be convexly formed toward the case 110. After the damping member 140 is coupled to the non-coating portion 122 and the current collector coupling part 133, the third region 143 may come into contact with the inner surface of the case 110. The third region 143 may prevent movement of the case 110 and the non-coating portion 122 and may absorb the shock applied between the case 110 and the non-coating portion 122. Therefore, the third region 14e may allow the electrode assembly 120 and the current collector 130 to be stably fixed within the case 110.

The first insulating member 150 may be formed on the body part 131 of the current collector 130. The first insulating member 150 may be formed between the current collector 130 and the cap plate 160. The first insulating member 150 may electrically insulate the current collector 130 and the cap plate 160. The first insulating member 150 may have a terminal hole formed therein to allow the terminal part 134 of the current collector 130 to penetrate the first insulating member 150 to then be exposed to an upper portion of the cap plate 160.

The cap plate 160 may be formed on the case 110 to then be coupled to the case 110. The cap plate 160 may seal the case 110 to prevent leakage of an electrolyte accommodated in the case 110. The cap plate 160 may have a terminal hole formed therein to allow the terminal part 134 of the current collector 130 to penetrate the terminal hole to then be exposed to the upper portion of the cap plate 160. The cap plate 160 may have an injection hole formed at one region to inject the electrolyte, and may have an injection plug 161 filling the injection hole after the electrolyte is injected. In addition, the cap plate 160 may have a safety vent 162, which may be formed roughly at the center of the cap plate 160. When internal gases are generated from the case 110 due to, for example, an over-charge, and the internal pressure of the case 110 may exceed a reference pressure. The safety vent 162 may be opened to exhaust the generated gases before other parts of the cap plate 160 are ruptured, thereby reducing a risk of explosion due to an increase in the internal pressure.

The second insulating member 170 may be formed on a top surface of the cap plate 160 along the periphery of terminal part 134 of the current collector 130. The second insulating member 170 may electrically insulate the cap plate 160 and the terminal part 134. In addition, the second insulating member 171 may allow the nut 180 engaged with the terminal part 134 from the top of the cap plate 160 to be electrically insulated from the cap plate 160.

The nut 180 may be coupled to the terminal part 134 from the top of the terminal part 134. The nut 180 may be engaged with a screw thread of the terminal part 134 through a screw thread formed therein. The nut 180 may be engaged with the terminal part 134 to fix the terminal part 134 on the cap plate 160. Therefore, a position of the electrode assembly 120 coupled to the terminal part 134 may be also fixed within the case 110. In addition, the position of the electrode assembly 120 may be fixed more stably on the cap plate 160 by the damping member 140, as described above.

By way of summation and review, as the capacity of secondary batteries gradually increases, it becomes more desirable to ensure user safety.

The secondary battery 100 according to an embodiment may include the elastic damping member 140 between the electrode assembly 120 and the case 110. Accordingly, it may be possible to suppress deformation of the electrode assembly 120 and the current collector 130. Moreover, it may be possible to prevent the electrode assembly 120 from moving within the case 110 and to prevent an external shock from being transmitted to the electrode assembly 120 by absorbing the external shock. In addition, the damping member 140 may press the current collector 130 such that the current collector coupling part 133 of the current collector 130 is compressed on the non-coating portion 122 of the electrode assembly 120, thereby preventing movement of the current collector 130 and absorbing the shock. In addition, the damping member 140 may have a hole formed therein. Accordingly, a passageway along which the exhausted gases generated from the case 110 can move may be provided, thereby ensuring the safety of the secondary battery 100.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope as set forth in the following claims.

What is claimed is:

1. A battery, comprising:
    an electrode assembly having an electrode uncoated region, including a plurality of electrode uncoated regions;
    a current collector including a current collector coupling part coupled to the electrode uncoated region, the current collector coupling part includes a plurality of current collector coupling parts coupled to the plurality of electrode uncoated regions;
    a case accommodating the electrode assembly; and
    an elastic damping member, the elastic damping member engaging the current collector coupling part, being disposed between a pair of current collector coupling parts, and including a first region coupled to at least one of the electrode uncoated regions, a second region pressing against the pair of the current collector coupling parts, and a third region contacting an inner side of the case,
    wherein, in an assembled condition of the electrode assembly and the case, the elastic damping member is in a compressed state to exert a pressing force that presses the pair of current collector coupling parts.

2. The battery as claimed in claim 1, wherein the elastic damping member is in an elastically deformable relationship with respect to the current collector coupling part.

3. The battery as claimed in claim 1, wherein the first region of the elastic damping member has a convexly curved surface.

4. The battery as claimed in claim 1, wherein the second region has a width that is smaller than a width of the first region, the second region defining a space that accommodates respective ones of the current collector coupling parts.

5. The battery as claimed in claim 1, wherein the third region of the elastic damping member has a convexly curved surface.

6. The battery as claimed in clam 5, wherein the third region is symmetrical to the first region.

7. The battery as claimed in claim 1, wherein:
the electrode uncoated regions include a pair of electrode uncoated regions that are parallel to each other in a first direction,
the current collector coupling parts are coupled to facing surfaces of the pair of electrode uncoated regions, and
the elastic damping member is located in a space between the current collector coupling parts such that the pressing force presses the current collector coupling parts against the electrode uncoated regions.

8. The battery as claimed in claim 7, wherein the elastic damping member includes a hole extending through the elastic damping member in a first direction.

9. The battery as claimed in claim 1, wherein:
the case further includes a cap plate coupled with the case, and
the current collector further includes a terminal part that extends through the cap plate, wherein:
the current collector further includes a body part that is connected to the terminal part and a bent part that is bent from the body part in a first direction, and
the current collector coupling parts extend from the body part in the first direction.

10. The battery as claimed in claim 9, wherein:
the electrode uncoated regions are parallel to each other in the first direction and are arranged in a second direction perpendicular to the first direction, and
the bent part has a width sufficient to cover the electrode uncoated regions in the second direction.

11. The battery as claimed in claim 1, wherein the elastic damping member is made of an electrically insulating material.

12. The battery as claimed in claim 11, wherein the elastic damping member is made of a plastic material.

13. The battery as claimed in claim 1, wherein:
the electrode uncoated region includes first and second electrode uncoated regions at opposite sides of the electrode assembly,
the current collector includes a first current collector including a first coupling part coupled to the first electrode uncoated region and a second current collector including a second coupling part coupled to the second electrode uncoated region, and
the elastic damping member includes a first elastic damping member engaging the first current collector coupling part and a second elastic damping member engaging the second current collector coupling part.

14. The battery as claimed in claim 1, wherein:
the electrode assembly includes a plurality of electrode assemblies inside the case, each electrode assembly having a respective electrode uncoated region,
the current collector includes a plurality of current collector coupling parts, each of the current collector coupling parts being coupled to the respective electrode uncoated region of one of the electrode assemblies, and
the elastic damping member includes a plurality of elastic damping members, each being disposed to engage certain ones of the current collector coupling parts.

15. A battery, comprising:
an electrode assembly having an electrode uncoated region;
a current collector including a current collector coupling part coupled to the electrode uncoated region;
a terminal part including an electrode terminal, the terminal part coupled to the current collector;
a case accommodating the electrode assembly; and
an elastic damping member, the elastic damping member engaging the current collector coupling part, wherein the elastic damping member is made of an electrically conductive material.

16. The battery as claimed in claim 15, wherein the elastic damping member is made of a same material as the current collecting coupling part.

* * * * *